March 27, 1962 A. LEFF 3,026,599
FABRIC SPREADING AND BIAS BINDING STRIP CUTTING DEVICE
Filed Sept. 3, 1959 4 Sheets-Sheet 1

INVENTOR.
ALBERT LEFF
BY
*Zoltan F. Holochek*
ATTORNEY

INVENTOR.
ALBERT LEFF
BY
ATTORNEY

March 27, 1962 A. LEFF 3,026,599
FABRIC SPREADING AND BIAS BINDING STRIP CUTTING DEVICE
Filed Sept. 3, 1959 4 Sheets-Sheet 3

INVENTOR.
ALBERT LEFF
BY
ATTORNEY

March 27, 1962 A. LEFF 3,026,599
FABRIC SPREADING AND BIAS BINDING STRIP CUTTING DEVICE
Filed Sept. 3, 1959 4 Sheets-Sheet 4
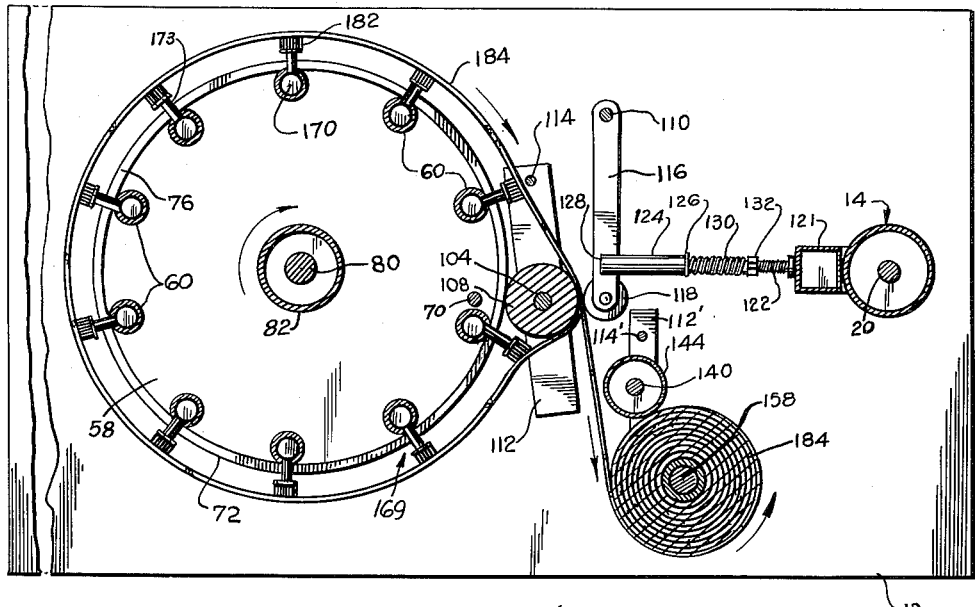
Fig. 4.
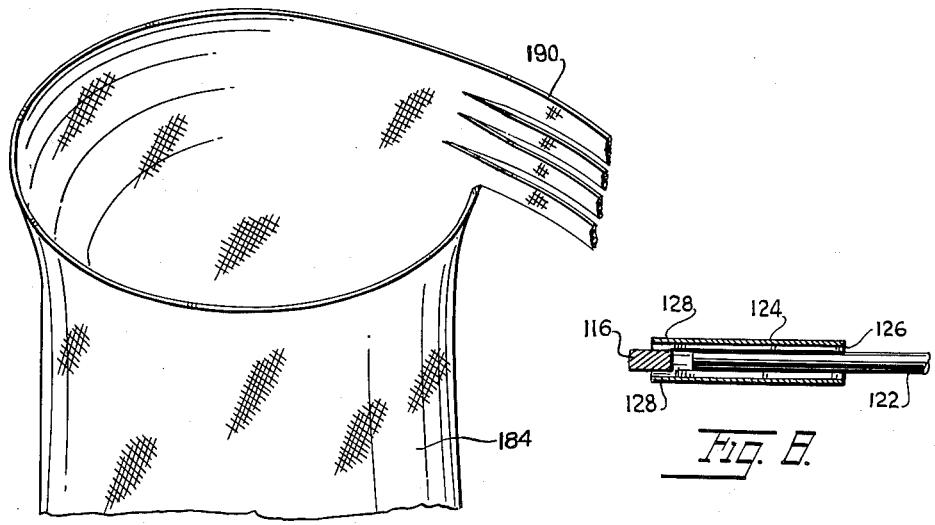
Fig. 5.
Fig. 6.
INVENTOR.
ALBERT LEFF
BY
ATTORNEY

3,026,599
FABRIC SPREADING AND BIAS BINDING STRIP CUTTING DEVICE
Albert Leff, 660 E. 242nd St., Bronx, N.Y.
Filed Sept. 3, 1959, Ser. No. 837,862
3 Claims. (Cl. 29—2.16)

This invention relates to a machine for cutting and winding tubular fabric material and in particular to apparatus for cutting a tube of fabric material into a plurality of strips and winding said strips into rolls.

Various machines have been used heretofore for cutting cloth strips of material from a tube thereof. Generally such machines include a mandrel over which the tube of material is drawn past a plurality of cutting wheels to form strips. The strips are wound upon reels or rollers. In such devices it is necessary that the material be drawn off from the mandrel at an angle to the axis of the tube so that it can be fed uniformly into the cutters. Heretofore, such machines have required constant attendance of an operator to smooth and straighten and guide the cloth manually into the cutters. If this is not done, the cloth wrinkles, warps and twists so that the strips cut are uneven in width, have ragged edges, and are unacceptable in quality.

The present invention has as a principal object provision of a machine for cutting cloth strips on the bias from tubular fabric in which the material is carried by a camming mandrel so that the fabric is held taut and properly positioned while being fed to cutters.

A further object is to provide an automatic cloth spreading means for a cloth strip cutting machine.

Another object is to provide a cloth feeding device for a cloth strip cutting machine which requires no attendance by an operator other than the initial setting up of a run of cloth and removal of rolls of cloth strips.

A further object is to provide a cloth strip cutting machine of the character described in which the number of strips cut by the machine may be varied as well as the widths of the strips.

A further object is to provide a bias strip cutting machine with a rotatable cam mandrel and cooperating cam follower brush-like members for advancing a tube of cloth material to a plurality of cutters.

According to the invention the machine includes a cloth spreader and smoother in the form of a tubular cam mandrel having a generally elliptical cam face. A plurality of brush-like members slidably mounted in tubular members, constituting trackways, are moved upwardly and around the cam mandrel. The brush-like members have bristles in contact with and engaging the cloth. As the brush-like members ride upwardly over the cam face they carry the tubular cloth around and up around the mandrel. The cloth is drawn off at a tangent from the crest of the cam face and under spring biased cutters whereby the cloth is severed into strips of predetermined uniform width. From the cutters the strips are drawn to a spindle where they are wound into rolls. During operation of the machine, the brush-like members guided by the cam grasp and carry the fabric upwardly in its path of movement, stretching and smoothing it so that no attention by an operator is required for this purpose. As a result, strip cutting operations can be performed at higher speed with more uniform results and at less labor cost than has hitherto been required.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 4 is a cross-sectional view taken on the plane of the line 4—4 of FIG. 2, on an enlarged scale, but with the details of the fabric supporting frame omitted for ease of illustration.

FIG. 5 is a diagrammatic view of the top of the tube of fabric as it looks when in position on the machine and leaving the cutters.

FIG. 6 is a top plan view of one of the spring-pressed cutting units.

FIG. 7 is a plan view of one of the cutters.

FIG. 8 is a longitudinal sectional view of the sleeve member of the spring-pressed cutting unit.

FIG. 9 is a side elevational view of a cloth spreading and supporting unit.

FIG. 10 is a face view of the cloth grasping member of the cloth spreading and supporting unit.

Figure 1:
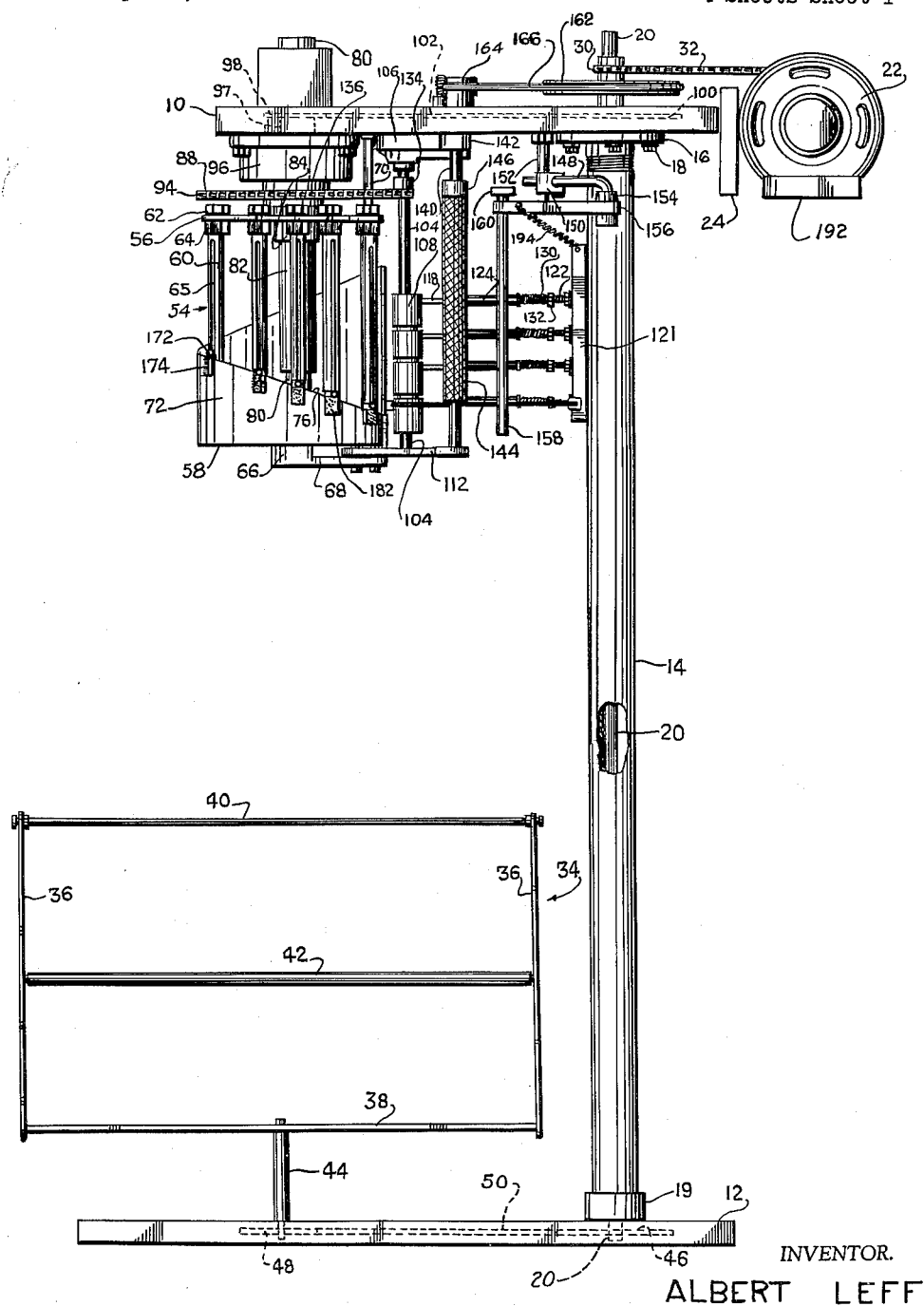
FIG. 1 is a side elevational view of a machine embodying my invention, parts being broken away.
Figure 2:
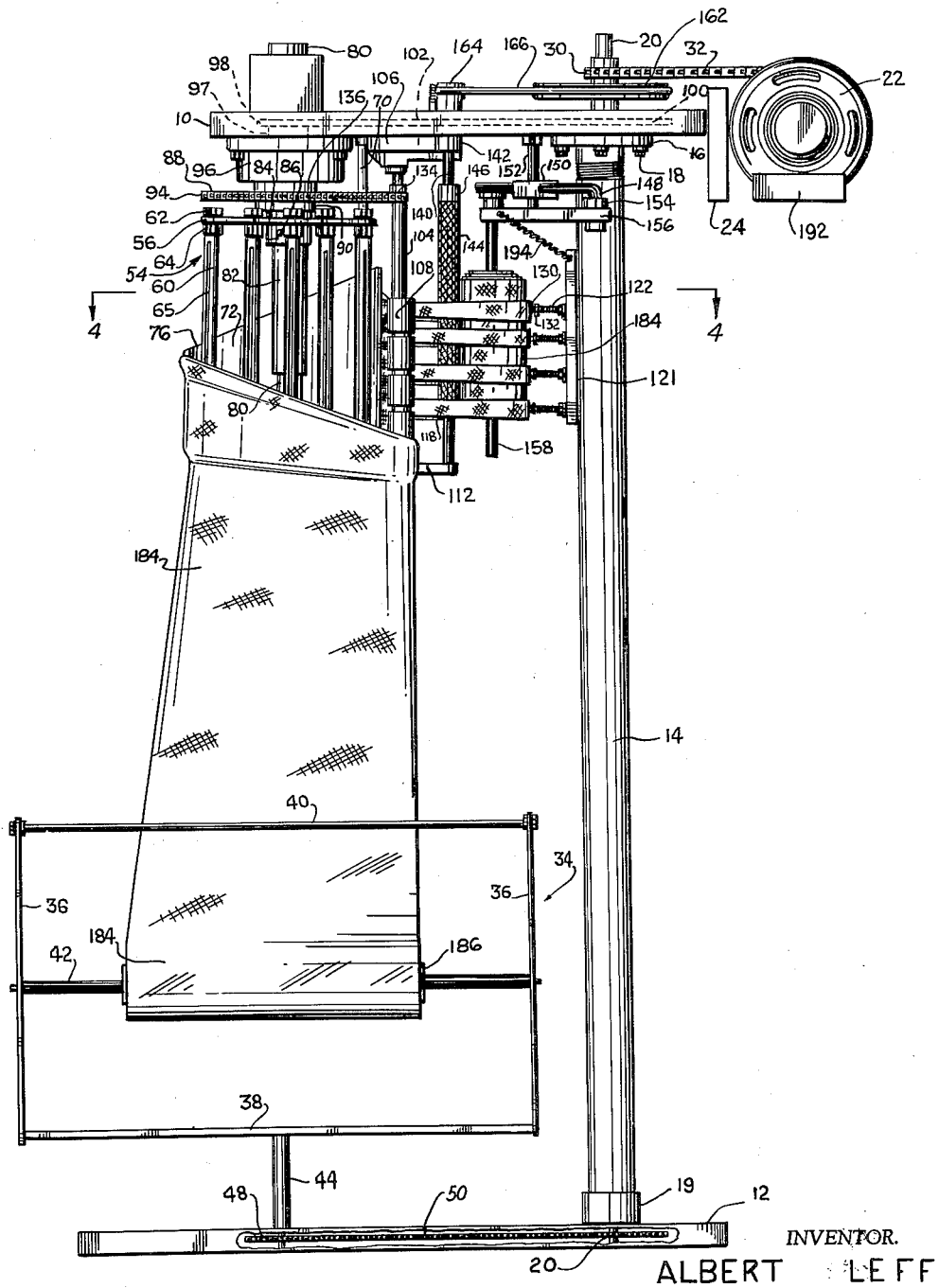
FIG. 2 is a similar view of the machine with fabric material in position and partly wound, parts being shown broken away.
Figure 3:
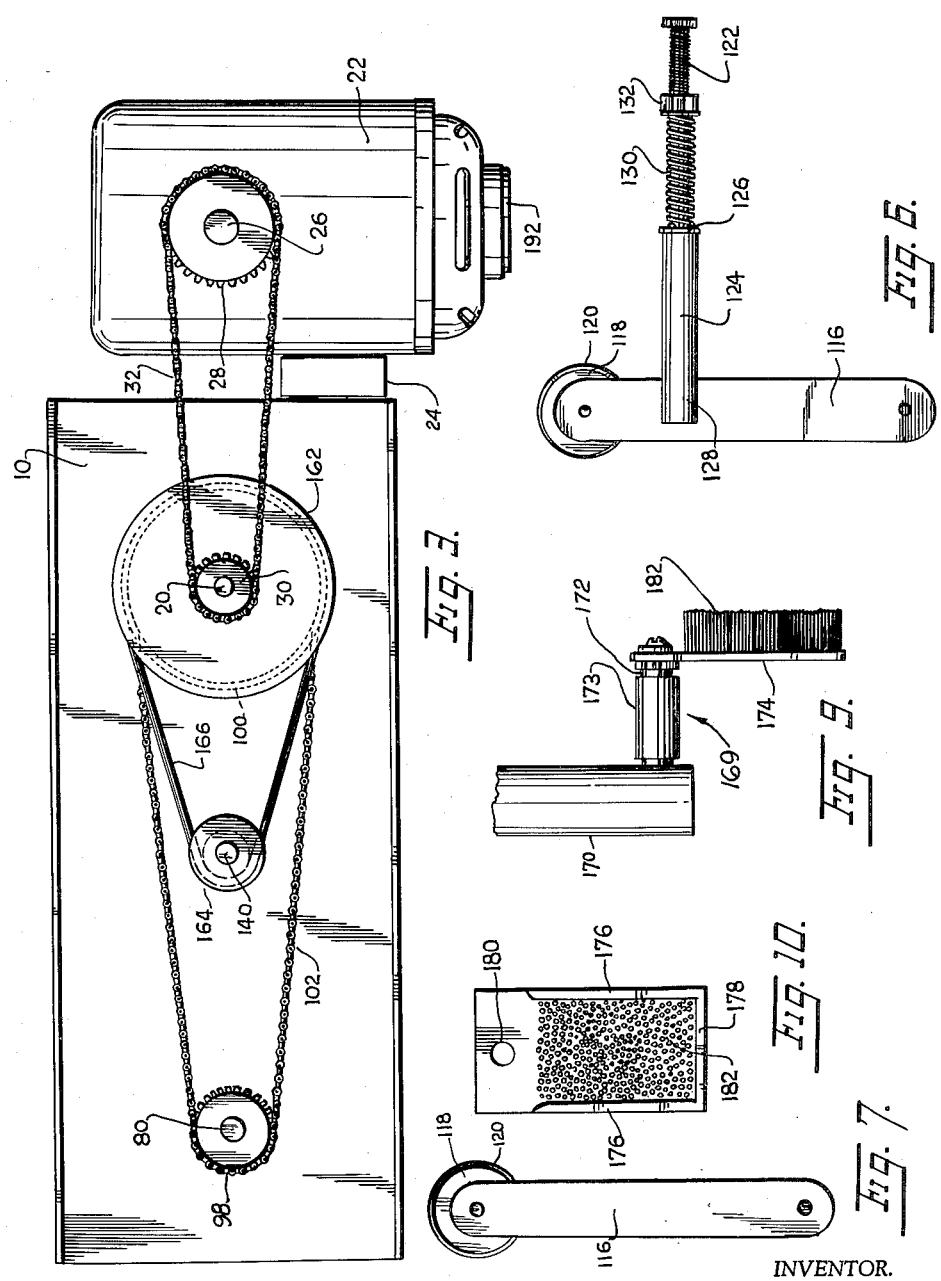
FIG. 3 is a top plan view thereof on an enlarged scale.

Referring in detail to the drawings, a machine embodying my invention for cutting tubular fabric material on the bias into strips and winding the cut strips into rolls is shown in FIG. 1. The machine comprises an upper channel-shaped casting 10 and a lower stout metal base plate 12 joined at one end by an upright pipe or post 14. At its upper end, the pipe is threaded into a collar 16 secured to the underside of the casting around an opening in the casting by bolts 18 and at its bottom end is secured in a flanged socket 19 fastened to the top of the base plate 12, around an opening therein.

A spindle 20 extends loosely through the pipe 14 and through the aligned openings in the casting 10 and base plate 12. A motor 22 supported on the adjacent end of the casting 10, by means of a block 24 fastened to the casting, drives the spindle by means of a shaft 26 operatively connected to the drive shaft of the motor, a gear 28 on shaft 26, a gear 30 on the top end of the spindle 20 and a chain 32 around said gears.

A U-shaped frame 34 for supporting a bolt of tubular fabric material to be cut and wound is rotatably mounted on the base plate 12. The frame comprises upright arms 36, 36 connected at their bottom ends by an integral bight portion 38 and at their free top ends by a pair of closely spaced horizontally disposed removable bars 40 for guiding the fabric material on its way to the supporting, cutting and winding mechanisms of the machine. A rod 42 is mounted on the end arms 36, 36, midway from the ends thereof. A shaft 44 depends from the bight portion 38 midway its ends and extends through an opening in the base plate 12. The shaft is operatively connected to the spindle 20 by means of a gear 46 on the bottom of the spindle and a gear 48 on the bottom end of the shaft 44, the gears being connected by a chain 50.

On the underside of the casting 10, directly above the frame 34, there is an apparatus for supporting the fabric in tubular form, in stretched unwrinkled condition, and for moving the fabric upwardly and around the mandrel to the cutters. This apparatus comprises a hollow cylindrical cage 54 including a rotatable top circular disk 56 and a fixed bottom circular disk 58. A plurality of spaced tubular members 60 depend from the top disk 56. The top ends of the tubular members 60 are screw-threaded and extend through openings around the periphery of the top disk and are secured thereto by top and bottom nuts 62 and 64, respectively. The bottom ends of the tubular members 60 are unattached. The tubular members are formed with opposed elongated slots 65 in the walls thereof, extending substantially the length of the members, the edges of said slots forming trackways. Any desired number of tubular members may be used depending upon the width of the material to be cut. The bottom disk 58 is fixed to the head 66 of a bracket 68 supported from the casting 10 by a hanger in the form of a rod 70 secured at its top end to the casting and at its bottom end to the bracket 68.

A side wall 72, constituting a mandrel, is formed integrally with the bottom disk 58, the bottom disk and side wall constituting a casting. The side wall encircles the tubular members 60 in closely spaced relation. The wall 72 is round with a generally elliptical-shaped top end edge forming an endless cam profile, face or trackway 76 which rises gradually from its lowermost point to its topmost point which is closely spaced below the top disk 56 and from which topmost point it drops abruptly to its lowermost point again.

The top and bottom disks are formed with aligned central openings through which a shaft 80 extends. The bottom protruding end of the shaft is journalled in the head 66 of the bracket 68. The shaft 80 extends through a sleeve 82 having a collar 84 secured to the shaft 80 by screws 86. The top disk 56 is bolted to the upper surface of the collar 84 and turns therewith. A circular disk 88 having a hub portion 90 is secured to the shaft 80 above the top disk 56 by means of screws extending through the hub portion thereof. The disk 88 has teeth 94 on its periphery. Above the disk 88, the shaft 80 extends through a perforated plate 96 bolted to the underside of the casting 10 and through an opening in the casting, being journalled in a bearing 97 on the top of the casting. The shaft 80 is operatively connected to the spindle 20 by a gear 98 secured to the top end of the shaft above the casting 10, a gear 100 secured to the spindle 20 above the casting and a chain 102 encircling the gears.

The mechanism for cutting or slitting the tubular fabric on the bias is supported by the casting 10 and includes an upright shaft 104 having its top end journalled in a plate 106 bolted to the underside of the casting and having its bottom end journalled in a bracket 112 supported by a hanger in the form of a post 114 depending from the casting 10. An elongated roller 108 is shown fastened on the shaft 104. The shaft and roller are disposed adjacent the crest of the cam trackway 76.

An upright post 110 is disposed behind the shaft 104 and spaced therefrom and depends from plate 106. A plurality of cutters are pivotally mounted on the post 110. Each cutter includes a flat bar 116 (FIG. 6) pivotally secured at one end to the post 110 and extending radially therefrom. The other end of the bar rotatably supports a cutting wheel or disk 118 having a sharp cutting edge 120. The bars 116 are adapted to be swung toward the roller 108 to bring their cutting wheels into contact with said roller. Means are provided for spring-pressing the cutters against the roller 108. This pressing means is supported by an elongated metal block 121 secured to the pipe 14, adjacent the top thereof, by any suitable fastening means. A plurality of threaded rods 122 are secured at one end to the block and extend radially therefrom. A tubular sleeve 124 surrounds the other end of each rod 122. The sleeve has a perforated end wall 126 through which the end of the rod extends. The other end of the sleeve is open and bifurcated, the bifurcations 128 straddling the opposite sides of the adjacent flat bar 116 carrying a cutting wheel 118. A coil spring 130 is sleeved around each rod 122 between the end wall 126 of the sleeve and a nut 132 threaded on the rod. The tension of the spring may be adjusted by moving the nut 132 along the rod. The sleeve normally yieldingly presses the respective bar 116 toward the roller 108. A gear 134 is fastened to the shaft 104 adjacent its top end on the same horizontal plane as the toothed disk 88 on shaft 80 and a chain 136 connects the toothed disk and the gear 134.

Mechanism is also provided for winding the fabric material after it is slitted. For this purpose an upright shaft 140 is disposed closely spaced from the roller 108. Shaft 140 has its upper end journalled in a plate 142 fastener to the underside of the casting 10 and has its bottom end journalled in a bracket 112 supported by post 114'. A roller 144 is sleeved on and secured to the shaft 140, with its outer surface preferably roughened. At the top of the roller, the outer surface is provided with a rubber band 146 or other suitable friction producing device. A round bar 148 is horizontally disposed and supported by a block 150 secured to the lower end of an upright post 152, the upper end of which is fastened to the underside of the casting 10. One end of the bar 148 is curved downwardly and supports a hub bearing member 154. A horizontally disposed metal arm 156 has one end pivotally secured to the bearing member 154. The other free end of the arm has an opening for rotatably supporting a spindle 158 having a circular head 160 secured at its top end above the arm 156. The spindle 158 is disposed parallel to the shaft 140 and the arm 156 is adapted to swing the head 160 of the spindle into contact with the rubber band 146 on the roller 144 on shaft 140. The shaft 140 is operatively connected to the spindle 20 by means of a large pulley 162 secured to the spindle between the gears 30 and 100 and a small pulley 164 secured to the top end of the shaft 140 where it protrudes above the casting 10. A belt 166 brings the drive from the large pulley to the small pulley 164.

In accordance with the present invention, mechanism is also provided for grasping the top edge of the tubular fabric material and moving said edge into alignment with the top edge of the side wall 72, constituting the mandrel, by carrying said top edge of the fabric material upwardly and around in smooth, tubular unwrinkled condition. For this purpose, a fabric gripping unit 169, constituting a cam follower, is slidably and yieldably associated with each of the tubular members 60. Each unit as shown in FIG. 9 comprises a round rod 170. A pin 172 extends radially from the bottom end of the bar and sleeved around the pin is a roller 173. A brush-like device is supported on the end of the pin 172. This brush-like device includes a rectangular-shaped backing plate 174 having flanges 176 along its long sides and a flange 178 along its bottom end with its top end unobstructed and formed with a central opening 180 to receive the end of the pin or screw 172. A plurality of wire bristles 182 extend outwardly of the backing plate beyond the outer edges of the flanges. The round rod 170 is freely slidable in its respective tubular member 60 with the pin 172 extending outwardly of the slot 65 and carrying the plate 174 with the bristles spaced slightly outwardly of the side wall 72. The face opposite to bristles 182 on plate 174 is disposed in a plane tangent to the outer surface of the side wall but projects slightly outwardly thereof.

In operation, a bolt of tubular fabric material 184 in flat pressed condition is wound around a tubular core 186 and the core slipped loosely over the rod 42 of frame 34. The end of the supported bolt, in such flat pressed condition, is inserted through the space between the guide bars 40 on the frame and once it passes the bars the end is manually spread apart into tubular condition by the operator. The spread-apart, stretched and tubular end of the fabric is then manually placed around the mandrel 72, and its top edge sleeved around into gripping engagement with the bristles 182 of the brush-like devices 169, with the top edge of the tubular fabric in register with the camming profile 76 of the mandrel 72. The cloth is stretched to cylindrical form by the outwardly extending bristles 182 of the brush-like members of the cam followers. Since the upper edge or profile of the cam mandrel is inclined at an angle to the axis thereof, the portion of the cloth engaged by the bristles is disposed at an angle to the axis of the cam mandrel 72.

The top tubular end of the fabric is then initially cut by a tool by the operator so as to provide a starting or runoff strip, such as the strip 190 shown in FIG. 5. The manually cut strip 190 is manually stretched from the crest of the cam trackway or profile 76 and extends tangentially of the mandrel 72. The stretched strip is manually wound around and fastened to the winding spindle 158 of the arm 156.

It will be noted that the cloth is pulled horizontally from the cam mandrel 72 while the transverse direction of knit of the cloth is parallel to the inclined cam profile 76. Thus, the cloth is fed in a bias direction to the direction of knit around the roller 108 for cutting engagement by the cutting wheels 118.

With the cloth in supported condition and the run-off strip cut therefrom and wound around the winding spindle 158, the machine is ready for automatic operation by actuating the switch 192 to start the motor 22. The main shaft or spindle 20 is turned by the motor by means of the chain 32. The drive from the spindle is brought to the shaft 80 by means of the chain 102 whereby the top disk 56 and tubular members 60 are turned. The drive is brought to the shaft 140 by the belt 166 whereby the friction sleeve 144 is rotated. Simultaneously with the rotation of the disk 56, tubular members 60 and the shaft 140, the frame 34 is rotated by the chain 50 which is connected to the spindle 20. The bolt of fabric and the spread apart tubular end of the fabric gripped by the bristles on the plates 174 turn in unison whereby twisting of the fabric is prevented and the operations of spreading apart and stretching the flat and pressed fabric into a tubular condition and the carrying of the tubular end upwardly and around the mandrel 72 are facilitated. Upon turning of the disk 56 and tubular members 60 with plates 174, the tubular end of the fabric, gripped by the plates 174, is carried upwardly and around the mandrel 72 by means of the bristles 182 on the plates 174. This operation is accomplished because the cam followers, including the radial pins 172 and rollers 173 on the sliding rods 170 in the tubular members 60, carrying the plates 174, ride upwardly upon the camming profile or trackway 76. The grasped end of the tubular fabric is carried upwardly and around to the crest of the cam trackway 76 at which point the uppermost cam follower unit 169 leaves the cloth and falls by gravity to the lowermost point on the cam trackway in order to grasp the lowermost point of the tubular end of the cloth for further operation.

The crest of the tubular end of the supported fabric is approximately even with the top of the roller 108 on shaft 104 and as the fabric continues to move around, a relatively wide strip of the fabric passes over the roller 108, the initial cutting of the run-off strip permitting this movement. This strip of cloth passes in a stretched flat condition over the roller 108 where the strip is engaged by the revolving cutting wheels 118 which are pressed against the strip by the spring-pressed sleeve members 124, and the strip is slit into smaller bias strips. From the cutters, the slit strips move to the rotating winding spindle 158. Spindle 158 is rotated by friction, initially by means of the engagement of the periphery of the circular head 160 of the spindle with the rubber band 146 on the rotating sleeve 144, and subsequently, as the rolls on the spindle build up, by the peripheries of the rolls on the spindle engaging the surface of the spinning sleeve 144.

The spindle 158 and supported rolls are yieldingly pressed into frictional contact with the rotating sleeve 144 by a coil spring 194 having one end connected to the block 121 and the other end to the arm 156. When the wound rolls on the spindle are sufficiently large, the machine is stopped and the unwound slit strips are cut from the rolls and the individual rolls removed from the spindle. The cut strips from the tubular end may then be wound around and secured to the winding spindle 158 for further operation.

Once the bolt of cloth is started through the machine, the slitting and winding operations continue smoothly and automatically until the slitting is completed. The machine continuously feeds, stretches and smooths the cloth without requiring attention of the operator until the individual rolls build up to the desired size.

More or less than the four cutters shown may be used and they may be spaced any desired distance to obtain different widths of strips.

Instead of the belt and pulley and gear and chain drives illustrated, any suitable means may be provided for driving the movable parts of the machine.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A machine for cutting bias strips from a tube of fabric material, the combination, comprising mechanism for feeding said fabric material to the cutter elements of the machine including a rotatable frame for supporting a bolt of tubular fabric material, a motor operatively connected to said frame for rotating the same, a stationary cylindrical cam mandrel above and in line with said frame, said mandrel having an elliptical shaped endless cam face, a disk above said mandrel rotatable in synchronism with said frame, tubular members secured to said disk and depending therefrom, said members having elongated slots constituting trackways, cam followers slidable along said trackways, said followers including cylindrical rods slidable in the tubular members, pins protruding from the ends of said rods through the slots in the tubular members to the outside of the cam mandrel, rollers sleeved on said pins adapted to engage the trackway, plates fixed to the outer ends of the pins and bristles protruding from said plates, a roller adjacent the mandrel at the crest of the cam face thereof, means for rotating said roller, a series of spaced cutter elements adjacent the roller for cutting fabric material passing over said roller, into bias strips, and a rotatable spindle and associated motor driven roller for drawing said cut strips from the cutter elements and winding same on the spindle.

2. A machine for cutting bias strips from a tube of fabric material comprising, a rotatable frame for supporting a bolt of tubular fabric material, a cylindrical cam mandrel above and in line with the frame, said mandrel having an elliptical shaped endless cam face, means for supporting an end of the bolt of tubular fabric material sleeved around said mandrel, said supporting means adapted to be moved upwardly and around the mandrel with the supported fabric material, said supporting means movable in synchronism with the movement of the frame, said supporting means including a shaft, a disk secured to the shaft, tubular members depending from the disk and having elongated slots serving as trackways, cam followers slidable in said tubular members with portions extending through said slots and outwardly of the cam mandrel and movable along said trackways, and brush-like devices secured to ends of the extending portions of the cam followers and having bristles adapted to grasp the sleeved end of the fabric material, mechanism for cutting the sleeved tubular fabric material into bias strips including a roller disposed adjacent the cam mandrel at the crest of its cam face, swingable cutters adapted to cut fabric material passing over said roller and spring pressed bifurcated sleeve members engaging said cutter elements for pressing same against the material passing over said roller and an electric motor for rotating said frame, said shaft and said latter roller.

3. In a machine of the kind described, mechanism for cutting tubular fabric material into a plurality of spiral strips, said mechanism including an elongated block, a plurality of threaded rods secured at one end to the block and extending radially therefrom, tubular sleeves surrounding the other ends of each rod, a coiled spring sleeved around each rod, one end of the spring engaging one end of the spring, a nut on the rod in contact with the other end of the sleeve for adjusting the tension thereof, a number of pivotally mounted depending bars in contact with the other ends of each sleeve, and a rotating cutting disk on the bottom free end of each bar, said springs and sleeves normally pressing the bars with cutting disks against a movable tube of fabric between the disks and a roller.

References Cited in the file of this patent
UNITED STATES PATENTS

| | | |
|---|---|---|
| 1,066,304 | Mitchell et al. | July 1, 1913 |
| 1,499,924 | Hausheer | July 1, 1924 |
| 2,644,522 | Parker et al. | July 7, 1953 |
| 2,696,252 | Rosen | Dec. 7, 1954 |
| 2,772,734 | Judelson | Dec. 4, 1956 |